US006967724B2

(12) United States Patent
Nishida (10) Patent No.: US 6,967,724 B2
(45) Date of Patent: *Nov. 22, 2005

(54) WAVEFRONT MEASURING APPARATUS AND WAVEFRONT MEASURING METHOD

(75) Inventor: Hiroyuki Nishida, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/895,331

(22) Filed: Jul. 21, 2004

(65) Prior Publication Data

US 2004/0257584 A1    Dec. 23, 2004

Related U.S. Application Data

(62) Division of application No. 10/083,558, filed on Feb. 27, 2002, now Pat. No. 6,785,006.

(30) Foreign Application Priority Data

Feb. 27, 2001   (JP) ............................. 2001-051408

(51) Int. Cl.$^7$ ............................................. G01B 9/02
(52) U.S. Cl. ...................................................... 356/515
(58) Field of Search ............................ 356/497, 512, 356/515, 489, 495

(56) References Cited

U.S. PATENT DOCUMENTS 4,743,117 A * 5/1988 Kitabayashi et al. ........ 356/512
6,633,362 B2 * 10/2003 Murakami et al. .......... 356/450

FOREIGN PATENT DOCUMENTS

JP      09-184787      7/1997
JP      10-090113      4/1998

* cited by examiner

Primary Examiner—Gregory J. Toatley, Jr.
Assistant Examiner—Patrick Connolly
(74) Attorney, Agent, or Firm—Kenyon & Kenyon (57) ABSTRACT

A wavefront measuring apparatus and a wavefront measuring method are capable of performing optical measurement on a test optical system, including an immersion optical system, with comparable ease of handling to that of the conventional measuring method using a concave member, and substantially independently of reflection that may occur at the surface closest to the test optical system among the surfaces of an optical member for reflecting light exiting from the test optical system. The wavefront measuring apparatus has a light source, a reference light path in which a reference member for producing reference light is disposed, and a test light path in which the test optical system is disposed. A plano-convex optical member with a wall thickness approximately equal to the radius of curvature of a convex surface thereof is disposed in the test light path in such a manner that a plane surface thereof faces toward the test optical system. The space between the test optical system and the plano-convex optical member is filled with a liquid.

17 Claims, 5 Drawing Sheets

WAVEFRONT MEASURING APPARATUS AND WAVEFRONT MEASURING METHOD

This is a division of application Ser. No. 10/083,558 filed 27 Feb. 2002, now U.S. Pat. No. 6,785,006 the content of which is incorporated herein by reference.

This application claims benefit of Japanese Application No. 2001-51408 filed in Japan on Feb. 27, 2001, the contents of which are incorporated by this reference.

BACKGROUND OF THE INVENTION

1. Field of the Invention

The present invention relates to a wavefront measuring apparatus and method for evaluating the optical performance of an optical system (hereinafter referred to as "test optical system") having a lens, a prism or other optical element. More particularly, the present invention relates to a wavefront measuring apparatus and method capable of conducting an optical performance evaluation without being affected by unwanted reflected light or irrelevant aberrations even when the test optical system is an immersion optical system.

2. Discussion of Related Art

Figure 8:
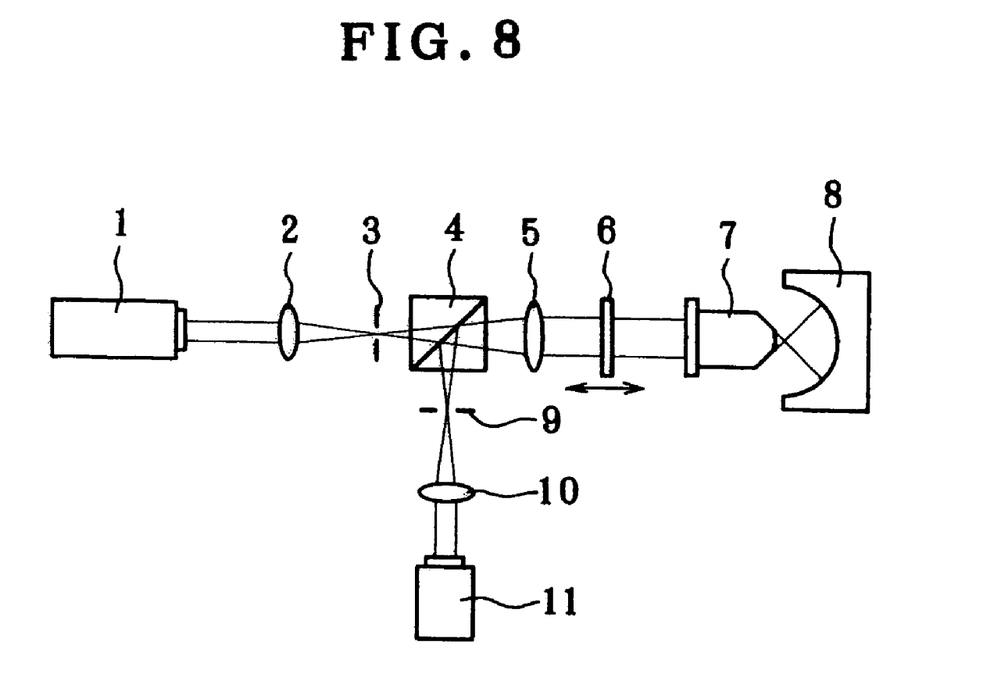
FIG. 8 is a diagram showing a conventional wavefront measuring apparatus.

A conventional measuring apparatus used to evaluate the performance of a test optical system is shown in FIG. 8. The measuring apparatus has a Fizeau interferometric optical system, which comprises a light source 1, a light-collecting lens 2, a pinhole 3, a beam splitter 4, a collimator lens 5, a semitransparent mirror 6 as a reference member, a concave member 8, a spatial filter 9, a relay lens 10, and a CCD camera 11 as an image pickup device. An objective 7 as a test optical system is placed between the semitransparent mirror 6 and the concave member 8.

Light emitted from the light source 1 is once collected on the pinhole 3 through the light-collecting lens 2. Light passing through the aperture of the pinhole 3 is formed into a parallel beam through the collimator lens 5 and incident on the semitransparent mirror 6. The semitransparent mirror 6 produces reflected light and transmitted light according to a predetermined reflectance (or transmittance). Of the light incident on the semitransparent mirror 6, light reflected from the semitransparent mirror 6 is herein referred to as "reference light". The reference light passes through the collimator lens 5 and is then reflected by the beam splitter 4. Then, the reference light passes successively through the spatial filter 9 and the relay lens 10 to enter the CCD camera 11.

Meanwhile, light passing through the semitransparent mirror 6 enters the objective 7. Herein, light passing through the test optical system (objective 7) is referred to as "test light". If the objective 7 has aberrations, the wavefront of the test light is deformed. After being collected through the objective 7, the test light diverges as it is incident on the concave member 8. The concave surface of the concave member 8 has such a curvature that the direction of reflection of the incident light is coincident with the direction of incidence of the light. Accordingly, the test light reflected from the concave surface of the concave member 8 reenters the objective 7 and exits therefrom in the form of a parallel beam. The parallel beam exiting from the objective 7 passes through the semitransparent mirror 6 and enters the CCD camera 11 in the same way as the reference light.

Light reflected from the beam splitter 4 includes the reference light and the test light. Therefore, interference occurs between the reference light and the test light, and interference fringes are formed on the CCD camera 11 by the relay lens 10. Thus, the state of the interference can be observed. It should be noted that interference fringes suitable for measurement can be obtained by moving the semitransparent mirror 6 along the optical axis. The interference fringes formed on the CCD camera 11 contain information concerning aberrations of the objective 7. Therefore, it is possible to obtain aberrations of the objective 7, e.g. wavefront aberrations, by analyzing the interference fringes.

It should be noted that, in the arrangement shown in FIG. 8, the optical path through which the reference light passes, i.e. from the semitransparent mirror 6 to the beam splitter 4 (or the CCD camera 11), corresponds to the reference light path. The optical path through which the test light passes, i.e. from the concave member 8 to the beam splitter 4 (or the CCD camera 11), corresponds to the test light path. The optical path from the light source 1 to the beam splitter 4 is a common light path. The optical path from the beam splitter 4 to the CCD camera 11 may also be said to be a common light path.

A similar technique of measuring the optical characteristics of a test optical system by utilizing an interferometric optical system as in the case of FIG. 8 is disclosed in Japanese Patent Application Unexamined Publication Number [hereinafter referred to as "JP(A)"] Hei 10-90113. In JP(A) Hei 10-90113, a hemispherical lens is used in place of the concave member 8. The reason for using the hemispherical lens is that the divergence angle of the beam can be reduced according to the refractive index of the vitreous material of the hemispherical lens. Thus, the optical member (the concave member 8 in FIG. 8 or the hemispherical lens in JP(A) Hei 10-90113) for reflecting the light exiting from the test lens back to it can be produced in a compact and lightweight structure. Further, it is possible to dispense with a compensating plate by taking into consideration the cover glass thickness when setting the thickness of the hemispherical lens.

JP(A) Hei 9-184787 discloses a technique that allows measurement of a test lens even when it is an immersion objective. In JP(A) Hei 9-184787, three test lenses are prepared, and wavefront measurement is carried out for each pair of the three lenses in such a manner that the two lenses are placed to face each other. In this way, a total of three combinations of the lenses are subjected to wavefront measurement, and a wavefront is determined by computation. In this case, if coordinate systems used for the measurement of the three combinations of the lenses are not held in a predetermined positional relationship, accurate computation cannot be executed. Therefore, the disclosed technique contrives that the coordinate systems should be held in a predetermined positional relationship. JP(A) Hei 9-184787 discloses that when the test lenses are immersion objectives, the space between the objectives placed to face each other is filled with a liquid.

JP(A) Hei 10-90113 certainly allows the optical element itself to be produced in a compact structure when a hemispherical lens is used, but it has the problem that the influence of reflected light from the plane portion of the hemispherical lens cannot be avoided. For example, as shown in FIG. 1 of JP(A) Hei 10-90113, air is present between the foremost lens element in the test lens and the hemispherical lens. Therefore, about 4% of light exiting from the test lens and entering the hemispherical lens is reflected at the plane portion of the hemispherical lens. The reflectance at the convex surface of the hemispherical lens is also about 4%.

Accordingly, light reflected from the plane surface of the hemispherical lens, which is not originally necessary for the measurement, is added to the test light reflected from the convex surface of the hemispherical lens. If the reflectance of a plane plate is set at about 4%, the reference light and the test light become approximately equal in intensity to each other. Therefore, interference fringes formed by interference are substantially the same as those which should originally be obtained, and thus have a fairly high contrast. However, if reflected light occurs at the plane portion of the hemispherical lens, this reflected light also interferes with the reference light, together with the test light. At this time, the intensity of the reflected light is approximately equal to that of the test light. Accordingly, the contrast of interference fringes produced by the reflected light is approximately equal to the contrast of interference fringes produced by the reference light and the test light.

Thus, with the arrangement disclosed in JP(A) Hei 10-90113, not only interference fringes produced by the reference light and the test light but also interference fringes produced by the reference light and the light reflected from the plane portion of the hemispherical lens are formed on the CCD camera. These two interference fringe patterns are obtained in the form of coherent summation (summation of amplitudes). Therefore, the two interference fringe patterns cannot be separated from each other after they have been imaged. In other words, it is impossible to remove the interference fringes produced by the reference light and light reflected from the plane portion of the hemispherical lens from the interference fringes produced by the reference light and the test light, which are originally necessary for the measurement. Consequently, accurate wavefront measurement cannot be carried out.

It is conceivable to provide the plane portion with an antireflection coating or the like for the purpose of reducing reflection at the plane portion. However, when the numerical aperture of the test optical system is high, the angle of light incident on the plane surface is about 70° at the maximum. It is very difficult in general practice to provide an antireflection coating capable of making the reflectance nearly zero with respect to a wide range of incident angles, i.e. from 0° to 70°. Further, because air is present between the test lens and the hemispherical lens, if the hemispherical lens deviates from a perfect hemisphere (exclusive of the amount of compensation made by the cover glass), the deviation appears as aberration, making it impossible to perform satisfactory measurement.

On the other hand, the technique disclosed in JP(A) Hei 9-184787 takes into consideration not only a dry optical system but also an immersion optical system as test optical systems but needs at least three sets of optical systems as test optical systems. Further, it is necessary to adjust the coordinate system for each combination of test optical systems. Accordingly, the optical system requires very severe adjustment. Thus, it is difficult to adjust the optical system.

SUMMARY OF THE INVENTION

The present invention was made in view of the above-described problems.

Accordingly, an object of the present invention is to provide a wavefront measuring apparatus and a wavefront measuring method that are capable of performing wavefront measurement on a test optical system with comparable ease of handling to that of the conventional measuring method using a concave member.

Another object of the present invention is to provide a wavefront measuring apparatus and a wavefront measuring method that are capable of performing favorable measurement on test optical systems even in the case of an immersion optical system in which the space between the object and the optical system is filled with a liquid.

Still another object of the present invention is to provide a wavefront measuring apparatus and a wavefront measuring method that are capable of performing favorable measurement substantially independently of reflection that may occur at the surface closest to a test optical system among the surfaces of an optical member for reflecting light exiting from the test optical system.

To solve the above-described problems, the present invention provides a wavefront measuring apparatus for measuring the wavefront of light passing through a test optical system. The wavefront measuring apparatus has a light source and a reference light path in which a reference member for producing reference light is disposed. The wavefront measuring apparatus further has a test light path in which the test optical system is disposed. A plano-convex optical member is disposed in the test light path in such a manner that a plane surface thereof faces toward the test optical system. The plano-convex optical member has a wall thickness approximately equal to the radius of curvature of a convex surface thereof. The space between the test optical system and the plano-convex optical member is filled with a liquid.

In addition, the present invention provides a wavefront measuring apparatus for measuring the wavefront of light passing through a test optical system. The wavefront measuring apparatus has a light source and a reference light path in which a reference member for producing reference light is disposed. The wavefront measuring apparatus further has a test light path in which the test optical system is disposed. A plano-convex optical member is disposed in the test light path in such a manner that a plane surface thereof faces toward the test optical system. The plano-convex optical member has a wall thickness approximately equal to the radius of curvature of a convex surface thereof. The optical path length of the test light path and that of the reference light path are approximately equal to each other. When the coherence length of the light source is denoted by L and the wall thickness of the plano-convex optical member is denoted by d and further the refractive index of the plano-convex optical member is denoted by $n_{opt}$, the following condition (2) is satisfied:

$$L < 2 \times n_{opt} \times d \quad (2)$$

In addition, the present invention provides a wavefront measuring method for measuring the wavefront of light passing through a test optical system by using a measuring optical system having a light source and a reference light path in which a reference member for producing reference light is disposed. The measuring optical system further has a test light path in which the test optical system is disposed. A plano-convex optical member is disposed in the test light path in such a manner that a plane surface thereof faces toward the test optical system. The plano-convex optical member has a wall thickness approximately equal to the radius of curvature of a convex surface thereof. The space between the test optical system and the plano-convex optical member is filled with a liquid.

In addition, the present invention provides a wavefront measuring method for measuring the wavefront of light passing through a test optical system by using a measuring optical system having a light source and a reference light path in which a reference member for producing reference light is disposed. The measuring optical system further has a test light path in which the test optical system is disposed.

A plano-convex optical member is disposed in the test light path in such a manner that a plane surface thereof faces toward the test optical system. The plano-convex optical member has a wall thickness approximately equal to the radius of curvature of a convex surface thereof. The optical path length of the test light path and that of the reference light path are approximately equal to each other. When the coherence length of the light source is denoted by L and the wall thickness of the plano-convex optical member is denoted by d and further the refractive index of the plano-convex optical member is denoted by $n_{opt}$, the following condition (2) is satisfied:

$$L < 2 \times n_{opt} \times d \quad (2)$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Wavefront measuring apparatus according to embodiments of the present invention measure the wavefront of light passing through a test optical system by utilizing interference. In a first arrangement according to the embodiments of the present invention, the wavefront measuring apparatus has, in order to produce interference, a light source, a reference light path in which a reference member for producing reference light is disposed, and a test light path in which the test optical system is disposed. A plano-convex optical member is disposed in the test light path in such a manner that a plane surface thereof faces toward the test optical system. The plano-convex optical member has a wall thickness approximately equal to the radius of curvature of a convex surface thereof. The space between the test optical system and the plano-convex optical member is filled with a liquid.

In the first arrangement, the space between the test optical system and the plano-convex optical member (hereinafter referred to as "plano-convex member") is filled with a liquid to reduce the difference between the refractive index at a side of the plane surface of the plano-convex member closer to the test optical system and the refractive index at the inside of the plano-convex member. The refractive index difference varies according to the refractive index of the plano-convex member and the refractive index of the liquid. As compared to an arrangement in which air is present between the test optical system and the plano-convex member, the first arrangement is much superior in capability of reducing the reflection of light at the plane surface of the plano-convex member, provided that the plano-convex members in the two arrangements have the same refractive index.

Thus, the first arrangement can minimize the generation of reflected light at the plane surface of the plano-convex member (the reflected light will hereinafter be referred to as "noise light"). If the generation of noise light is minimized, substantially no interference fringes are produced by the noise light and the reference light. Accordingly, the first arrangement makes it possible to detect only interference fringes produced by the test light and the reference light, which are originally necessary for the measurement.

Further, minimization of the refractive index difference between the liquid and the plano-convex member results in a marked reduction in the amount of aberration produced by the plano-convex member even if it is not a perfect hemisphere. Let us, for example, assume that the center wall thickness of the plano-convex member is larger than that of a corresponding perfect hemisphere. This is equivalent to a situation in which a plane-parallel plate is present between the test optical system and the plano-convex member. If the refractive index difference between the liquid and the plano-convex member is large, aberration occurs at a portion of the plano-convex member that corresponds to a plane-parallel plate. However, if the refractive index difference between the liquid and the plano-convex member is sufficiently small, the portion corresponding to a plane-parallel plate can be regarded as being approximately equivalent to the liquid. If there is no refractive index difference, the arrangement is equivalent to a situation in which no plane-parallel plate is present. Even when there is a refractive index difference, if it is small, the thickness that is converted to a plane-parallel plate is correspondingly small. Therefore, the amount of aberration produced by the plano-convex member is very small. It should be noted that the above discussion also holds true for a case where the center wall thickness of the plano-convex member is smaller than that of a corresponding perfect hemisphere.

Thus, by minimizing the refractive index difference between the liquid and the plano-convex member, it becomes unnecessary to form the plano-convex member into a perfect hemisphere and hence possible to relax the requirement for the manufacturing accuracy when the plano-convex member is produced. Consequently, the productivity of the plano-convex member can be improved. In addition, the first arrangement is superior in that it is unnecessary to prepare a plurality of test optical systems, and that wavefront measurement can be performed on an immersion optical system with substantially the same operability as in the measurement with an optical system using a concave member.

It should be noted that the liquid used in the first arrangement may be immersion oil such as that used in microscopes, for example. However, when the test optical system is an immersion optical system, it has generally been designed on the assumption that the optical system will be used through a predetermined immersion liquid. Therefore, the liquid used in the first arrangement should preferably be the same immersion liquid that is assumed to be used by the test optical system. Alternatively, it is preferable to use a liquid having approximately the same refractive index as that of the immersion liquid.

In the first arrangement, it is preferable to satisfy the following condition (1):

$$|n_{liq} - n_{opt}| \leq 0.1 \quad (1)$$

where $n_{liq}$ denotes the refractive index of the liquid, and $n_{opt}$ denotes the refractive index of the plano-convex optical member.

The condition (1) is a condition for further minimizing the generation of noise light. Let us explain the condition (1). Measurement of a high-precision optical system (i.e. an optical system satisfactorily corrected for aberrations) needs to minimize error components occurring in the apparatus. There are various error components. Among them, noise light is a matter of our concern. The condition (1) is necessary to satisfy in order to further minimize the generation of noise light. If $|n_{liq} - n_{opt}|$ exceeds the upper limit, i.e. 0.1, the intensity of noise light becomes excessively high. Consequently, unwanted interference fringes (noise component) produced by the noise light are formed in addition to interference fringes that are originally necessary. Therefore, it is unfavorable to set $|n_{liq} - n_{opt}|$ in excess of 0.1.

In contrast, if a liquid and a plano-convex member are selected so that the condition (1) is satisfied, the intensity of noise light can be reduced sufficiently. As a result, it becomes possible to minimize the generation of unwanted interference fringes and hence possible to obtain only interference fringes originally required. Further, even if the plano-convex member is not a perfect hemisphere, it is possible to minimize the amount of aberration produced by the plano-convex member. Accordingly, the first arrangement is particularly useful for measurement of a high-precision optical system.

In a second arrangement according to the embodiments of the present invention, the wavefront measuring apparatus has a light source, a reference light path in which a reference member for producing reference light is disposed, and a test light path in which a test optical system is disposed. A plano-convex optical member is disposed in the test light path in such a manner that a plane surface thereof faces toward the test optical system. The plano-convex optical member has a wall thickness approximately equal to the radius of curvature of a convex surface thereof. The optical path length of the test light path and that of the reference light path are set approximately equal to each other. When the coherence length of the light source is denoted by L and the wall thickness of the plano-convex optical member is denoted by d and further the refractive index of the plano-convex optical member is denoted by $n_{opt}$, the following condition (2) is satisfied:

$$L < 2 \times n_{opt} \times d \quad (2)$$

With the second arrangement, even if noise light is generated, formation of interference fringes by the noise light is prevented. The condition (2) is a condition for preventing formation of interference fringes by noise light.

The first arrangement suppresses reflection at the plane surface of the plano-convex member by filling the space between the test optical system and the plano-convex member with a liquid. However, there are cases where it is very difficult to suppress the reflection from the viewpoint of principle. For example, when the plano-convex member is made of glass and the test optical system is a water-immersion optical system, the reflection is very difficult to suppress. In this case, the liquid filling the space between the test optical system and the plano-convex member is water. Water is lower in refractive index than oil. Therefore, the refractive index difference between the liquid and the plano-convex member cannot satisfactorily be reduced when the liquid is water.

More specifically, when the test optical system is a water-immersion optical system, the reflection at the plane surface of the plano-convex member is about 0.4%. Because the reflection at the convex surface of the plano-convex member is about 4%, noise light accounts for about 10% of the overall reflected light. Whether or not interference fringes produced by noise light accounting for about 0.4% of the test light affect the measurement depends on the required measurement accuracy. However, such noise light cannot be ignored at least when high-precision measurement is demanded.

Incidentally, interference is a phenomenon that occurs when the difference in optical path length between the reference light path and the test light path is not longer than the coherence length of the light source. In the second arrangement, light that may interfere with the reference light are mainly the test light and the noise light. The test light and the noise light differ from each other in that the test light returns to the test optical system after traveling between the plane and convex surfaces of the plano-convex member, whereas the noise light returns to the test optical system after being reflected from the plane surface of the plano-convex member. That is, in comparison as to the optical path length from the light source to the image pickup device, the optical path length of the test light is longer than that of the noise light by $2 \times n_{opt} \times d$.

Therefore, in the second arrangement, the test light path and the reference light path are formed so that distances through which the test light and the reference light travel to reach the image pickup device are approximately equal to each other. Further, a light source having a shorter coherence length L than $2 \times n_{opt} \times d$ is used. With this arrangement, because the optical path lengths of the test light and the reference light are approximately equal to each other, the optical path difference is substantially zero. In other words, the optical path difference is smaller than the coherence length of the light source. Therefore, the test light and the reference light produce interference fringes. On the other hand, the optical path difference between the noise light and the reference light is larger than $2 \times n_{opt} \times d$. That is, the optical path difference exceeds the coherence length L of the light source. Therefore, the noise light and the reference light produce no interference fringes.

Consequently, with the second arrangement, such an intensity distribution is formed on the image pickup device that an interference component (bright-dark component) formed by the test light and the reference light is superimposed on a background component (uniform-brightness component) due to the noise light. It should be noted, however, that the intensity distribution is the summation of the intensities of the two components. Therefore, the background component can be removed (subtracted) by image processing executed at a subsequent step. Accordingly, it is possible to take out only interference fringes formed by the test light and the reference light. Thus, the second arrangement can remove the noise component due to the noise light and is therefore capable of complying with the requirements of the measurement of a high-precision optical system.

In the case of a Fizeau interferometric optical system such as that shown in FIG. 8, however, there is an optical path difference between the reference light path and the test light path from the beginning. Therefore, when a Fizeau interferometric optical system is used in the second arrangement, it may be impossible to obtain interference fringes and hence impossible to perform the intended measurement. For this reason, an interferometric optical system wherein the optical path lengths of the test light path and the reference light path can be made equal to each other is preferably used in the second arrangement, for example, a Michelson interferometric optical system or a Mach-Zehnder interferometric optical system.

It should be noted that if a laser having a long coherence length is used as a light source, for example, it is necessary in order to satisfy the condition (2) to increase the wall thickness d of the plano-convex member. If the wall thickness d is increased, the plano-convex member becomes large in size. Hence, the production of the plano-convex member becomes difficult. In addition, the measuring apparatus is caused to increase in size. Therefore, it is preferable to use a light source having a short coherence length, that is, a low-coherence light source, e.g. a super-luminescent diode, a light-emitting diode, or a mercury lamp.

In the first and second arrangements, it is also preferable to satisfy the following condition (3):

$$|n_{med}-n_{opt}|\times|r-d|\leq 0.01 \text{ mm} \quad (3)$$

where: $n_{med}$ denotes the refractive index of a medium lying between the test optical system and the plano-convex optical member; $n_{opt}$ denotes the refractive index of the plano-convex optical member; r denotes the radius of curvature of the plano-convex optical member; and d denotes the wall thickness of the plano-convex optical member.

The condition (3) is a condition for reducing aberration occurring in the plano-convex member. The term "aberration occurring in the plano-convex member" as used herein means aberration that occurs when the configuration of the plano-convex member deviates from a perfect hemisphere. More specifically, it is aberration occurring owing to the difference of the wall thickness of the plano-convex member from a predetermined wall thickness.

When aberration occurs in the plano-convex member, the aberration introduced into the wavefront of the test light is the sum of aberration occurring in the test optical system and the aberration occurring in the plano-convex member. As has been stated above, information concerning the wavefront of the test light appears as interference fringes through interference with the reference light. However, in a state where interference fringes are formed, the aberration occurring in the test optical system and the aberration occurring in the plano-convex member cannot be separated from each other. Therefore, it is impossible to detect only the aberration occurring in the test optical system.

If the condition (3) is satisfied, the aberration occurring in the plano-convex member can be reduced. For example, if $|r-d|$ is large, the arrangement is equivalent to a state where a plane-parallel plate is present between the test optical system and the plano-convex member. However, because $|n_{med}-n_{opt}|$ is small, the arrangement is equivalent to a state where no plane-parallel plate is present, as has been stated in connection with the condition (1). Accordingly, it is possible to minimize the aberration occurring in the plano-convex member. If $|r-d|$ is small, on the other hand, a plane-parallel plate is not present. Hence, it is possible to minimize the aberration occurring in the plano-convex member. It should be noted that if $|r-d|$ is small, $|n_{med}-n_{opt}|$ can be made somewhat large. However, if $|n_{med}-n_{opt}|$ is large, noise light occurs at the plane surface of the plano-convex member. Therefore, it is preferable not to make $|n_{med}-n_{opt}|$ very large.

Thus, if the condition (3) is satisfied, it is possible to suppress at least aberration occurring owing to the fact that the plano-convex member is not a perfect hemisphere although there is unwanted reflected light from the plane surface of the plano-convex member. It should be noted that the value of $|n_{med}-n_{opt}|$ may be of the order of 0.2 to 0.5 in a case where the wavelength is in the visible range and the test optical system is a water-immersion optical system, although it depends on the material of the plano-convex member. In a case where the wavelength is in the infrared range and the test optical system is an ordinary optical system, when silicon is used as the material of the plano-convex member, the value of $|n_{med}-n_{opt}|$ may be about 4. The term "ordinary optical system" as used herein means an optical system in which the space between the object and the test optical system is filled with air.

Further, it is desirable that a reflective coating be provided at least on the convex surface of the plano-convex member among the optical members disposed in the test light path and the reference light path. In the arrangement shown in FIG. 8, the concave member 8 generally uses reflection at a surface of a constituent material, e.g. glass. Thus, measurement is carried out with reflected light that accounts for about 4% of the incident light. However, such measurement is extremely inefficient from the viewpoint of utilization efficiency of light emitted from the light source. It is conceivable to provide a reflective coating on the concave surface of the concave member 8 for the purpose of increasing the efficiency. It is, however, difficult to provide a reflective coating because of difficulty in ensuring the required coating surface accuracy and so forth, as has been stated above. In this regard, if the member that is to be provided with a reflective coating is a plano-convex member as in the present invention, the accuracy of the reflecting surface is determined by the surface accuracy of the convex surface of the constituent material. Extremely speaking, it is necessary that the reflective coating be merely present over the surface of the convex portion of the plano-convex member. Accordingly, it becomes possible to effectively utilize light from the light source without technical difficulty regarding coating. Even if noise light occurs at the plane surface of the plano-convex member, it is possible to perform measurement with a favorable SN ratio because the amount of test light can be increased by providing a reflective coating on the convex surface.

It is also preferable to provide a reflective coating on the reference member, which produces reference light. If the absolute values of the intensities of the reference light and the test light are increased in this way and the intensities of the two light are made substantially equal to each other, the contrast of interference fringes formed by the test light can be increased relative to the contrast of interference fringes formed by the noise light. Accordingly, it is possible to perform measurement with an even more favorable SN ratio.

Embodiments of the present invention will be described below in detail with reference to the accompanying drawings.

(First Embodiment)

Figure 1:
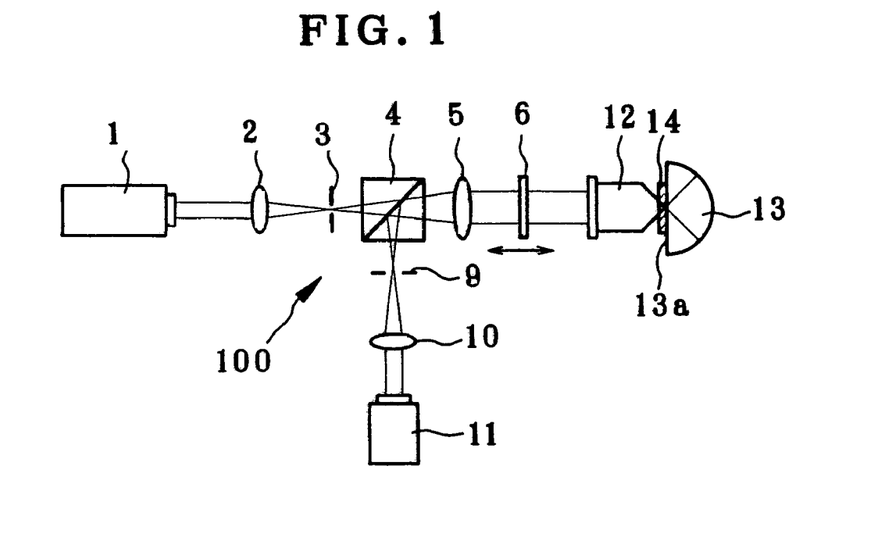
FIG. 1 is a diagram showing a first embodiment of the wavefront measuring apparatus according to the present invention.

A first embodiment of the wavefront measuring apparatus according to the present invention will be described. FIG. 1 is a diagram showing the arrangement of a wavefront measuring apparatus according to the first embodiment. The wavefront measuring apparatus 100 is based on the Fizeau interferometric optical system as in the case of FIG. 8. Therefore, the same constituent elements as those shown in FIG. 8 are denoted by the same reference numerals, and a description thereof is omitted. The wavefront measuring apparatus 100 according to this embodiment uses a plano-convex lens (plano-convex member) 13 in place of the concave member 8 used in FIG. 8. The test optical system 12 is an immersion optical system. Therefore, the space between the test optical system 12 and the plano-convex lens 13 is filled with an immersion liquid 14.

Test light emitted from the light source 1 and passing through the test optical system 12 is reflected by the convex surface of the plano-convex lens 13. The reflected test light passes through the test optical system 12 again and is reflected by the beam splitter 4 to reach the CCD camera 11. Meanwhile, a part of the light emitted from the light source 1 is reflected by the semitransparent mirror (reference member) 6 to reach the CCD camera 11 as in the case of the test light. By interference between the test light and the reference light, interference fringes are formed on the CCD camera 11. If the interference fringes are taken into an image analyzer to perform each analysis, it is possible to measure the wavefront of the light passing through the test optical system, i.e. various aberrations occurring in the test optical system. Thus, the wavefront measuring apparatus according to this embodiment can perform wavefront measurement on an immersion optical system by the same operation as in the conventional wavefront measuring apparatus.

In this embodiment, the light source 1 is a He—Ne laser, and the immersion liquid 14 is oil. The refractive index $n_{liq}$ ($n_{med}$) of the immersion liquid 14 is 1.513 at the wavelength of 633 nm. The refractive index $n_{opt}$ of the vitreous material of the piano-convex lens 13 is 1.51462 at the wavelength of 633 nm. Accordingly, the refractive index difference $|n_{liq}(n_{med})-n_{opt}|$ between the two at the wavelength of 633 nm is 0.00162, which satisfies the condition (1) in the present invention. Thus, the wavefront measuring apparatus according to this embodiment satisfies the condition (1). Hence, light reflected at the plane surface 13a of the plano-convex lens 13 is substantially zero. Further, because the value of $|n_{liq}(n_{med})-n_{opt}|$ is small, the demanded tolerances (manufacturing errors) for the wall thickness of the plano-convex lens 13 are not very strict.

Regarding the plano-convex lens 13 used in this embodiment, the radius r of curvature of the convex surface is 12.504±0.002 mm, and the wall thickness d is 12.5 mm. Hence, the absolute value of the difference, i.e. |r−d|, is 0.006 mm at the maximum. Therefore, the condition (3) is satisfied. It should be noted that, as the plano-convex lens 13, it is preferable to use a plano-convex lens made so that the absolute value of the difference between the curvature radius r and the wall thickness d, i.e. |r−d|, is within 0.03 mm.

However, it is a matter of course that the value of |r−d| depends on the optical performance of the test optical system 12. In a case where the test optical system 12 is a high-precision and high-performance optical system, for example, the accuracy required for measurement becomes strict. In such a case, therefore, it is necessary to reduce the value of |r−d|.

When the test optical system 12 is an optical system using water as an immersion liquid as in the case of a water-immersion objective, the plano-convex lens 13 should preferably be made by using a resin material such as Cytop (trade name; manufactured by Asahi Glass Company, Ltd.). By doing so, measurement similar to the above can be performed. The reason for this is as follows. At the wavelength of 633 nm, the refractive index of the immersion liquid 14, which is water, is 1.331, and the refractive index of Cytop is 1.34. Hence, $|n_{liq}(n_{med})-n_{opt}|=0.009$. Thus, the condition (1) is satisfied.

(Second Embodiment)

Figure 2:
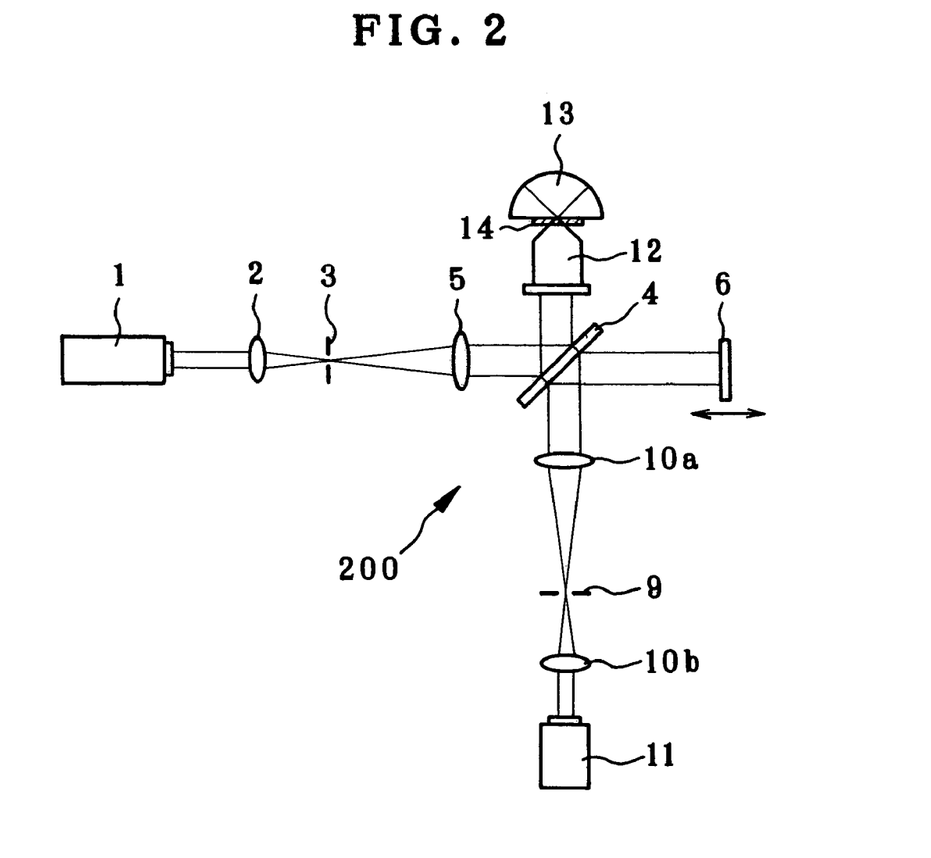
FIG. 2 is a diagram showing a second embodiment of the wavefront measuring apparatus according to the present invention.

A second embodiment of the wavefront measuring apparatus according to the present invention will be described. FIG. 2 is a diagram showing the arrangement of a wavefront measuring apparatus according to the second embodiment. In the second embodiment, the wavefront measuring apparatus 200 is based on the Michelson interferometric optical system. In the case of the Michelson interferometric optical system, a laser beam from the light source 1 is separated into transmitted light propagating rectilinearly through the beam splitter 4 and reflected light propagating in a direction different from the direction of the transmitted light (in the second embodiment, the reflected light propagates in a direction perpendicular to the direction of the transmitted light).

In this embodiment, the semitransparent mirror 6 is disposed on the transmitted light side to produce reference light. Accordingly, the optical path between the beam splitter 4 and the semitransparent mirror 6 is a reference light path. On the other hand, the objective 12 and the plano-convex lens 13 are disposed on the reflected light side. The space between the objective 12 and the plano-convex lens 13 is filled with an immersion liquid 14. Accordingly, the optical path between the beam splitter 4 and the plano-convex lens 13 is a test light path.

In contrast to the first embodiment, the collimator lens 5 in this embodiment is disposed closer to the light source 1 than the beam splitter 4. Therefore, light passing through the beam splitter 4 or reflected therefrom is a parallel beam. In addition, a first relay lens 10a is placed between the beam splitter 4 and the spatial filter 9. Light (interference light) passing through the spatial filter 9 is collected through a second relay lens 10b to form interference fringes on the CCD camera 11. Thus, interference fringes finally obtained with the CCD camera 11 are the same as in the first embodiment. Accordingly, the same measurement as in the first embodiment can be performed. The interferometric optical system is not necessarily limited to the Michelson interferometric optical system or the Fizeau interferometric optical system. Other interferometric optical systems are also usable.

(Third Embodiment)

Figure 3:
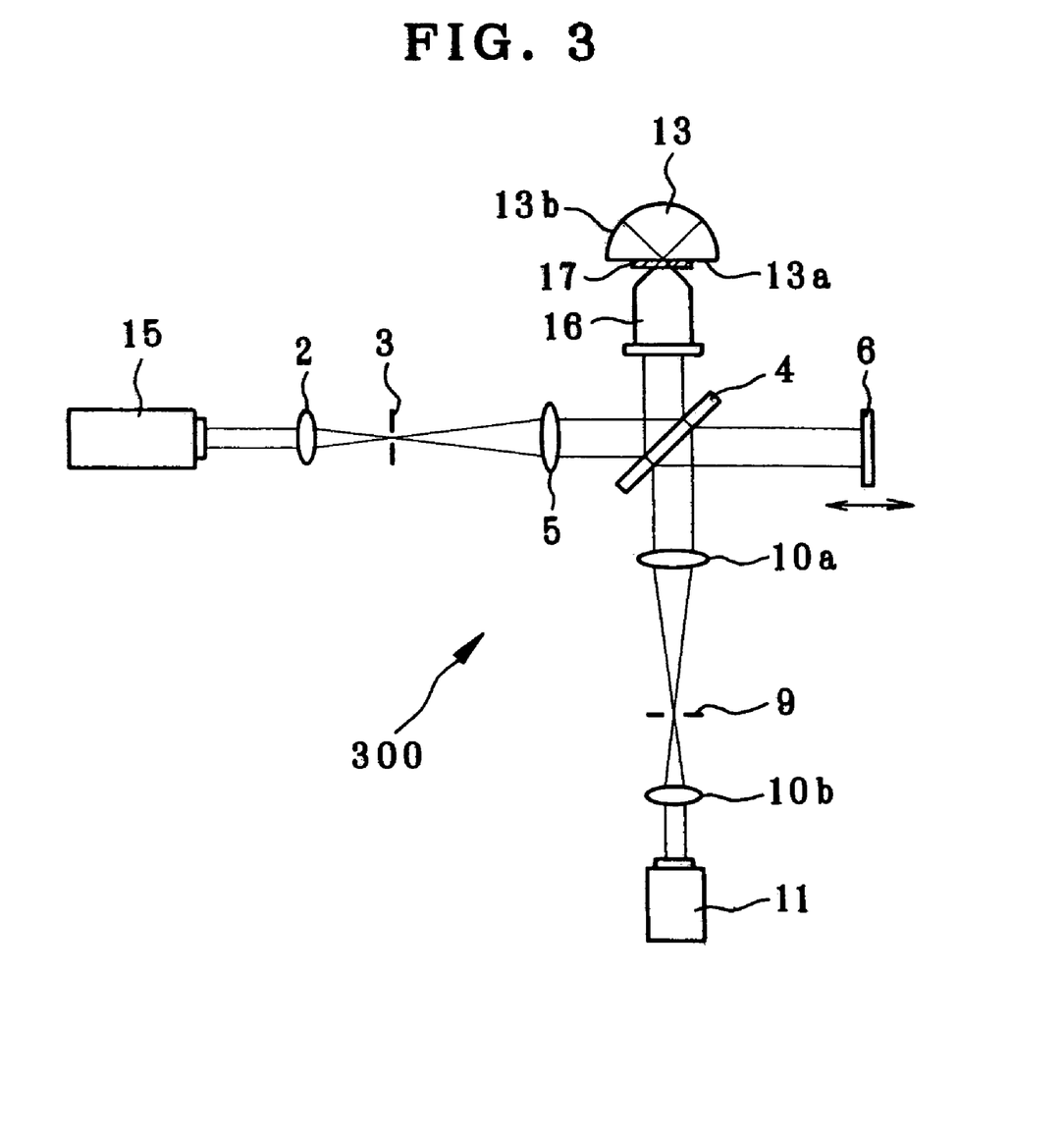
FIG. 3 is a diagram showing a third embodiment of the wavefront measuring apparatus according to the present invention.

A third embodiment of the wavefront measuring apparatus according to the present invention will be described. FIG. 3 is a diagram showing the arrangement of a wavefront measuring apparatus according to the third embodiment. In the third embodiment, the wavefront measuring apparatus 300 is based on the Michelson interferometric optical system in the same way as in the second embodiment.

In this embodiment, a low-coherence light source is used as a light source 15. Examples of low-coherence light sources usable in the present invention include a laser having a very short coherence length in comparison to the laser light source 1 used in the first and second embodiments, a mercury lamp, and a super-luminescent diode. In this embodiment, because a low-coherence light source is used, measurement is carried out in a state where the optical path length from the beam splitter 4 to the convex surface of the plano-convex lens 13 and the optical path length from the beam splitter 4 to the semitransparent mirror 6 are adjusted so as to be equal to each other. There are two methods of adjusting the optical path length: 1) moving the semitransparent mirror 6 along the optical axis; and 2) moving the objective 16 and the plano-convex lens 13 together as one unit along the optical axis. The method in which the semitransparent mirror 6 is moved is easier.

It should be noted that, in the foregoing arrangement, the plano-convex lens 13 is made so that the round-trip optical path length ($2 \times n \times d$) between the plane surface 13a and the convex surface 13b is longer than the coherence length of the light source 15. In other words, the difference between the round-trip optical path length from the beam splitter 4 to the plane surface 13a of the plano-convex lens 13 and the round-trip optical path length from the beam splitter 4 to the reflecting surface of the semitransparent mirror 6 is longer than the coherence length of the light source 15. Therefore, light traveling along these optical paths do not interfere with each other. Accordingly, even if there is reflected light from the plane surface 13a of the plano-convex lens 13, the reflected light is uniformly present in the form of a background for interference fringes. Therefore, the reflected light from the plane surface 13a has no effect on the interference fringes as the object of measurement. Further, because the background component can be removed by post-processing, it is possible to improve the accuracy of fringe analysis made thereafter if appropriate processing is executed to remove the background component.

In this embodiment, the coherence length L of the light source 15 is 150 μm. The wall thickness d of the plano-convex lens 13 is 12.5 mm, and the refractive index $n_{opt}$ of the plano-convex lens 13 is 1.51825. Therefore, the condition (2) is satisfied.

In this embodiment, the test optical system 16 is a water-immersion optical system. Therefore, the immersion liquid 17 filling the space between the test optical system 16 and the plano-convex lens 13 is water. The refractive index $n_{liq}$ ($n_{med}$) of water for the spectral e-line is 1.334, and the refractive index $n_{opt}$ of the plano-convex lens 13 for the spectral e-line is 1.51825. Hence, $|n_{liq}(n_{med})-n_{opt}|=0.18425$. Thus, the condition (1) is not satisfied. However, the curvature radius r of the plano-convex lens 13 is 12.504±0.002 mm. Hence, $|r-d|=0.006$ mm at the maximum. Therefore, the condition (3) is satisfied.

Thus, in this embodiment, the influence of aberration occurring in the plano-convex lens 13 can be eliminated although it is not possible to satisfactorily eliminate the influence on interference fringes of the reflected light from the plane surface 13a of the plano-convex lens 13. It should be noted that, as the plano-convex lens 13, it is preferable to use a plano-convex lens made so that the absolute value of the difference between the curvature radius r and the wall thickness d, i.e. $|r-d|$, is within 0.03 mm.

(Fourth Embodiment)

Figure 4:
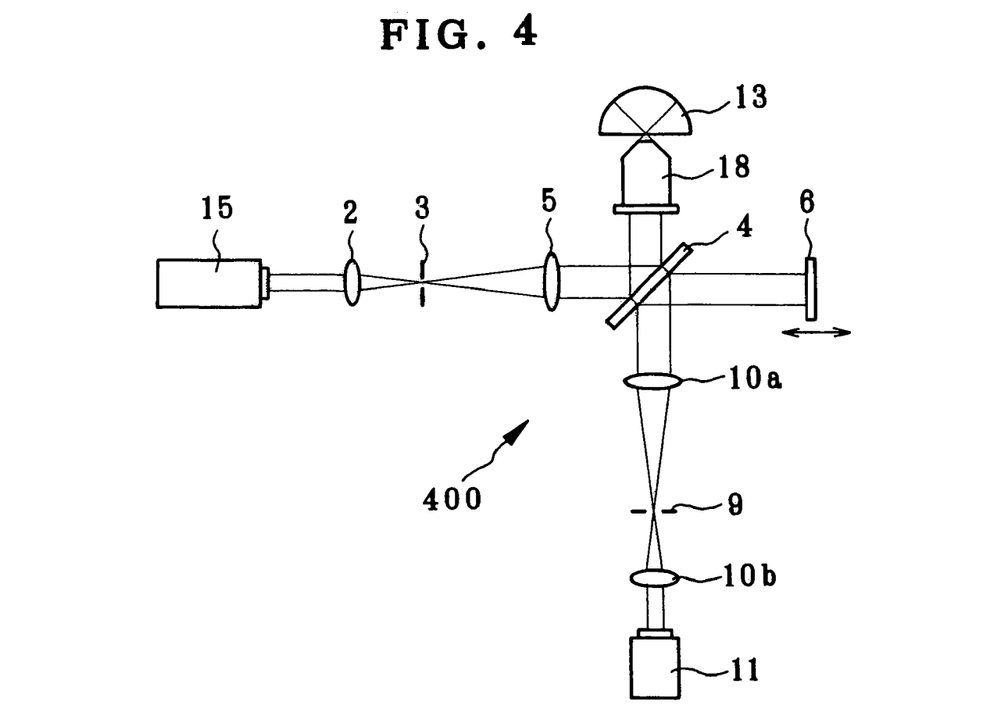
FIG. 4 is a diagram showing a fourth embodiment of the wavefront measuring apparatus according to the present invention.

A fourth embodiment of the wavefront measuring apparatus according to the present invention will be described. FIG. 4 is a diagram showing the arrangement of a wavefront measuring apparatus according to the fourth embodiment. In the fourth embodiment, the wavefront measuring apparatus 400 is based on the Michelson interferometric optical system in the same way as in the third embodiment. This embodiment differs from the third embodiment in that the test optical system 18 is not an immersion optical system but an ordinary optical system. The term "ordinary optical system" as used herein means an optical system in which the space between the test optical system and the sample is filled with air, which is also referred to as "dry optical system".

Even when the test optical system 18 is such an ordinary optical system, if a light source having a short coherence length is used as the light source 15, reflected light from the plane surface 13a of the plano-convex lens 13 does not contribute to the interference, as has been stated in connection with the third embodiment. That is, interference fringes formed on the CCD camera 11 contain wavefront information concerning only the test optical system. Therefore, wavefront measurement can be performed on an ordinary optical system with high accuracy.

In this embodiment, because the space between the test optical system 18 and the plano-convex lens 13 is filled with air, the refractive index $n_{opt}$ is 1.51825, and the refractive index $n_{med}$ is 1. Hence, $|n_{liq}(n_{med})-n_{opt}|=0.51825$. On the other hand, the wall thickness d of the plano-convex lens 13 is 12.5 mm, and the curvature radius r of the plano-convex lens 13 is 12.50±0.002 mm. Hence, $|r-d|=0.006$ mm at the maximum. Therefore, the condition (3) is satisfied.

Thus, in this embodiment, the influence of aberration occurring in the plano-convex lens 13 can be eliminated although it is not possible to satisfactorily eliminate the influence on interference fringes of the reflected light from the plane surface 13a of the plano-convex lens 13. It should be noted that, as the plano-convex lens 13, it is preferable to use a plano-convex lens made so that the absolute value of the difference between the curvature radius r and the wall thickness d, i.e. $|r-d|$, is within 0.01 mm.

(Fifth Embodiment)

Figure 5:
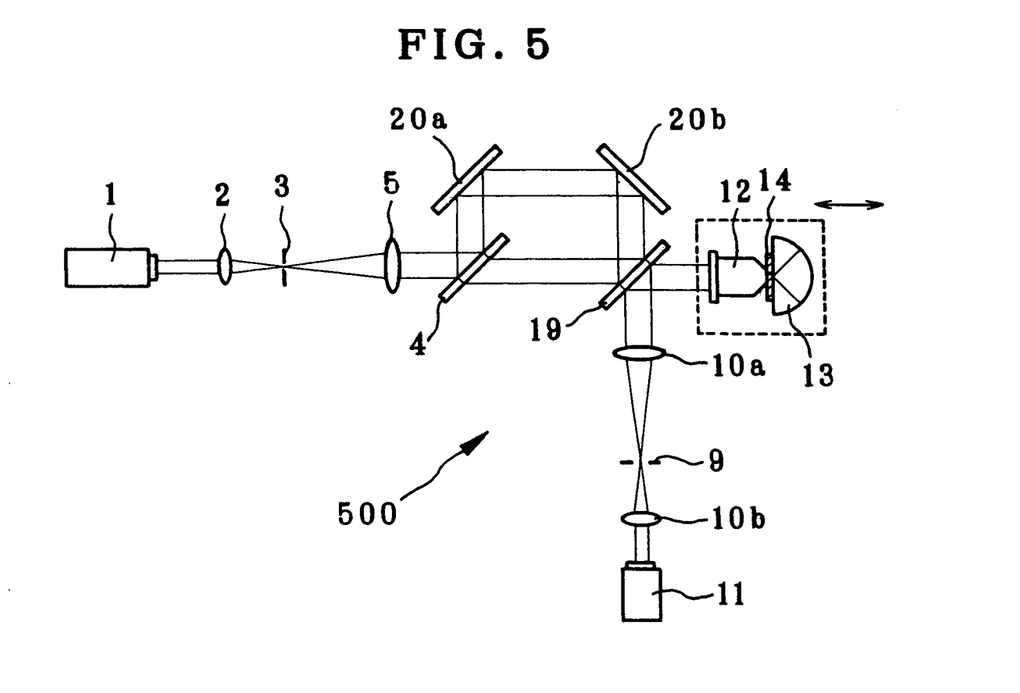
FIG. 5 is a diagram showing a fifth embodiment of the wavefront measuring apparatus according to the present invention.

A fifth embodiment of the wavefront measuring apparatus according to the present invention will be described. FIG. 5 is a diagram showing the arrangement of a wavefront measuring apparatus according to the fifth embodiment. In the fifth embodiment, the wavefront measuring apparatus 500 is based on a modification of the Mach-Zehnder interferometric optical system. Light emitted from the light source 1 is split into transmitted light and reflected light through the beam splitter 4. In this embodiment, the optical path of the light reflected from the beam splitter 4 to reach a mirror 20a is a reference light path. The mirror 20a, together with a mirror 20b, is disposed in the reference light path to lead reference light to a beam combiner 19. On the other hand, the light passing through the beam splitter 4 passes through the beam combiner 19 to enter the test optical system 12. This is a test light path.

In this embodiment, the light source 1 is a laser having a long coherence length, and the test optical system 12 is an immersion optical system. However, a light source 15 having a short coherence length may be used as a light source. When the light source 15 having a short coherence length is used, it is necessary to adjust the respective optical path lengths of the reference light path and the test light path. In this embodiment, optical path length adjustment is performed by moving the test optical system 12, the immersion liquid 14 and the plano-convex lens 13 together as one unit along the optical axis, as shown by the double-headed arrow.

(Sixth Embodiment)

Figure 6:
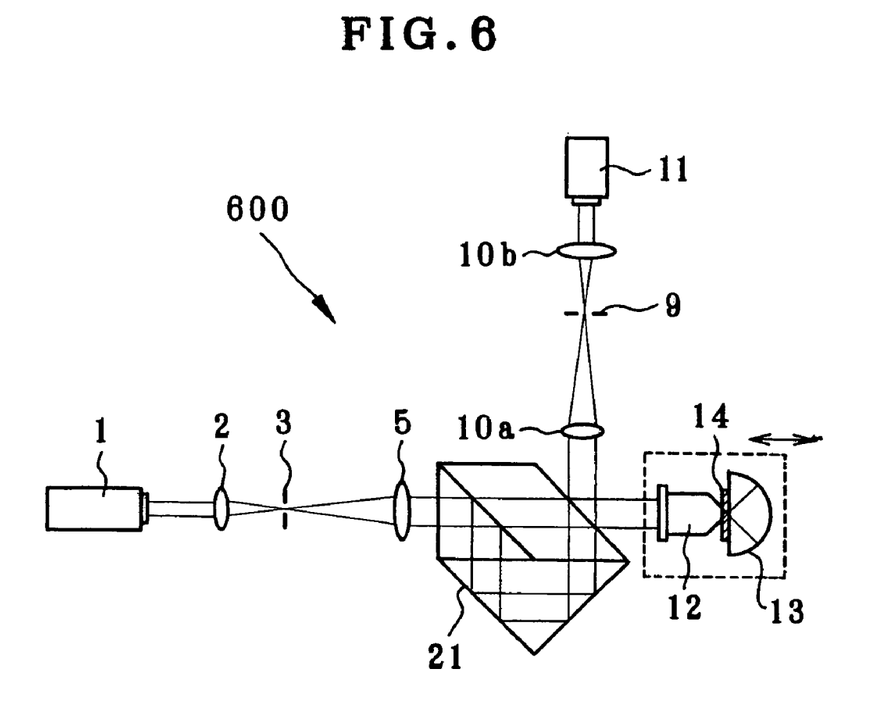
FIG. 6 is a diagram showing a sixth embodiment of the wavefront measuring apparatus according to the present invention.

A sixth embodiment of the wavefront measuring apparatus according to the present invention will be described. FIG. 6 is a diagram showing the arrangement of a wavefront measuring apparatus according to the sixth embodiment. The wavefront measuring apparatus 600 according to the sixth embodiment is characterized in that interferometric optical system sections (including a reference light path and a test light path) are formed from a prism. By integrating the interferometric optical system sections into a prism 21, the interferometric optical system can be prevented from being readily affected by the influence of disturbance, such as the fluctuation of air.

(Seventh Embodiment)

Figure 7:
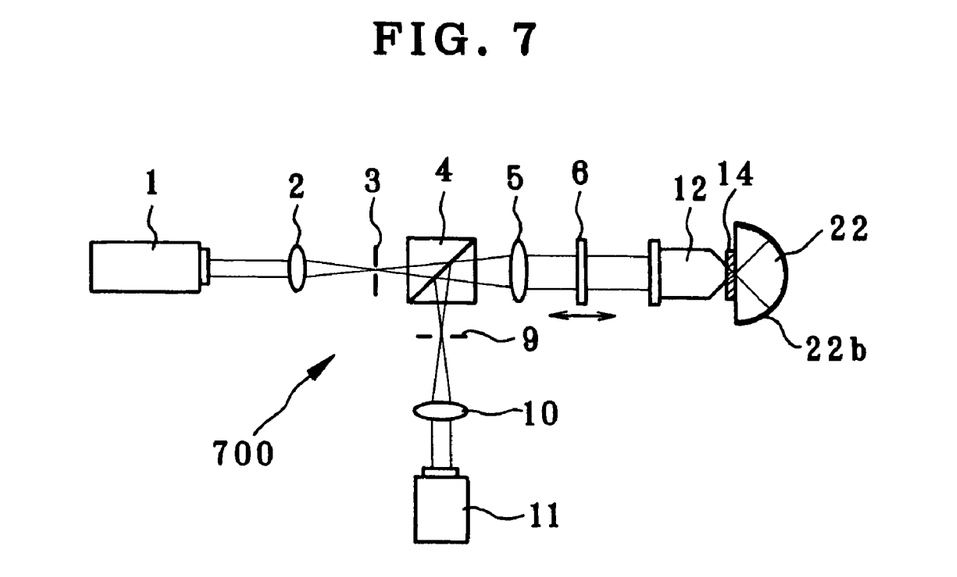
FIG. 7 is a diagram showing a seventh embodiment of the wavefront measuring apparatus according to the present invention.

A seventh embodiment of the wavefront measuring apparatus according to the present invention will be described. FIG. 7 is a diagram showing the arrangement of a wavefront measuring apparatus according to the seventh embodiment. The basic structure of the wavefront measuring apparatus 700 according to the seventh embodiment is the same as that of the first embodiment. However, the seventh embodiment differs from the first embodiment in that the test optical system 12 is a water-immersion optical system, and a plano-convex lens 22 has aluminum evaporated onto a convex surface 22b thereof.

Light emitted from the light source 1 separates into reference light reflected from the semitransparent mirror 6 and test light passing through the semitransparent mirror 6 and further passing through the test optical system 12. The test light enters the plano-convex lens 22 and reaches the convex surface 22b. Because the convex surface 22b is provided with a reflective coating (aluminum vapor deposition). In this embodiment, the reflectance at the convex surface 22b is raised to about 90% by the reflective coating. Meanwhile, the semitransparent mirror 6 is also provided with a reflective coating that provides a reflectance of about 35%. Although measurement can be performed on an immersion optical system and so forth even if the reflective coatings are not provided, it is preferable to provide the reflective coatings with a view to increasing the measurement accuracy.

The arrangement in which a reflective coating is provided on the convex surface of the plano-convex lens is also advantageous from the following viewpoint. Let us consider a case where the concave surface of the concave member 8 is provided with a reflective coating in the conventional arrangement. In this case, test light is reflected at the air-contact surface side of the reflective coating. Accordingly, it is necessary to ensure high coating accuracy (i.e. the accuracy and smoothness of the coating configuration) for the air contact surface side of the reflective coating. Therefore, an advanced coating technique is required. In contrast, in a case where a reflective coating is provided on the convex surface of a plano-convex lens as in this embodiment, test light is reflected at an interface surface between the convex surface 22b of the plano-convex lens 22 and the reflective coating. In this regard, the surface accuracy (i.e. the accuracy of the surface configuration and the surface roughness) of the interface is determined by the forming accuracy of the convex surface 22b of the plano-convex lens 22. In other words, the surface accuracy of the interface does not depend on the surface accuracy of the air contact surface side of the reflective coating. Accordingly, the reflective coating in this embodiment is allowed to be nonuniform in coating thickness. Extremely speaking, it is only necessary that the reflective coating be present over the convex surface. Thus, no advanced coating technique is required, and the amount of test light can be increased easily.

It will be apparent that a reflective coating may be provided on the convex surface 13b of the plano-convex lens 13 in the first to sixth embodiments. In this case, the semitransparent mirror 6 should preferably be provided with a reflective coating as in the case of the convex surface 13b of the plano-convex lens 13. A metal other than aluminum is also usable for coating. It is also possible to use a dielectric multilayer coating.

As has been stated above, the wavefront measuring apparatus according to the present invention allows wavefront measurement to be performed on an immersion optical system with comparable ease of handling to that of the conventional wavefront measuring apparatus using a concave member.

Further, it is possible to suppress the generation of noise light at a plane surface of a plano-convex member for reflecting test light. It is also possible to minimize the occurrence of aberration due to an error in configuration of the plano-convex member. Accordingly, a wavefront affected only by aberrations of the test optical system can be detected in the form of interference fringes.

What is claimed is:

1. A wavefront measuring method for measuring a wavefront of light passing through a test optical system by using a measuring optical system having a light source, a reference light path in which a reference member for producing reference light is disposed, and a test light path in which said test optical system is disposed, wherein a plano-convex optical member is disposed in said test light path in such a manner that a plane surface thereof faces toward said test optical system, said plano-convex optical member having a wall thickness approximately equal to a radius of curvature of a convex surface thereof;

a space between said test optical system and said plano-convex optical member is filled with a liquid, and wherein the test optical system to be measured is an objective lens for microscopes.

2. A wavefront measuring method for measuring a wavefront of light passing through a test optical system by using a measuring optical system having a light source, a reference light path in which a reference member for producing reference light is disposed, and a test light path in which said test optical system is disposed, wherein a plano-convex optical member is disposed in said test light path in such a manner that a plane surface thereof faces toward said test optical system, said plano-convex optical member having a wall thickness approximately equal to a radius of curvature of a convex surface thereof;

a space between said test optical system and said plano-convex optical member is filled with a liquid, and wherein the following condition (1) is satisfied:

$$|n_{liq} - n_{opt}| \leq 0.1 \tag{1}$$

where $n_{liq}$ denotes a refractive index of said liquid, and $n_{opt}$ denotes a refractive index of said plano-convex optical member; and wherein the test optical system to be measured is an objective lens for microscopes.

3. A wavefront measuring method for measuring a wavefront of light passing through a test optical system by using a measuring optical system having a light source, a reference light path in which a reference member for producing reference light is disposed, and a test light path in which said test optical system is disposed, wherein a plano-convex optical member is disposed in said test light path in such a manner that a plane surface thereof faces toward said test optical system, said plano-convex optical member having a wall thickness approximately equal to a radius of curvature of a convex surface thereof, an optical path length of said test light path and that of said reference light path are made approximately equal to each other, and the following condition (2) is satisfied:

$$L < 2 \times n_{opt} \times d \quad (2)$$

where: L denotes a coherence length of said light source; d denotes a wall thickness of said plano-convex optical member; and $n_{opt}$ denotes a refractive index of said plano-convex optical member; and wherein the test optical system to be measured is an objective lens for microscopes.

4. A wavefront measuring method for measuring a wavefront of light passing through a test optical system by using a measuring optical system having a light source, a reference light path in which a reference member for producing reference light is disposed, and a test light path in which said test optical system is disposed, wherein a plano-convex optical member is disposed in said test light path in such a manner that a plane surface thereof faces toward said test optical system, said plano-convex optical member having a wall thickness approximately equal to a radius of curvature of a convex surface thereof;

a space between said test optical system and said plano-convex optical member is filled with a liquid;

wherein the following condition (3) is satisfied:

$$|n_{med} - n_{opt}| \times |r - d| \leq 0.01 \text{ mm} \quad (3)$$

where: $n_{med}$ denotes a refractive index of a medium lying between said test optical system and said plano-convex optical member; $n_{opt}$ denotes a refractive index of said plano-convex optical member; r denotes a radius of curvature of said plano-convex optical member; and d denotes a wall thickness of said plano-convex optical member;

wherein the test optical system to be measured is an objective lens for microscopes.

5. A wavefront measuring method for measuring a wavefront of light passing through a test optical system by using a measuring optical system having a light source, a reference light path in which a reference member for producing reference light is disposed, and a test light path in which said test optical system is disposed, wherein a plano-convex optical member is disposed in said test light path in such a manner that a plane surface thereof faces toward said test optical system, said plano-convex optical member having a wall thickness approximately equal to a radius of curvature of a convex surface thereof;

a space between said test optical system and said plano-convex optical member is filled with a liquid, wherein at least the convex surface of said plano-convex optical member is provided with a reflective coating; and wherein the test optical system to be measured is an objective lens for microscopes.

6. A wavefront measuring method for measuring a wavefront of light passing through an objective lens for microscopes as recited in claim 1, and further including:

displaying results on a display portion for indicating wavefront aberration of said objective lens for microscopes upon measurement by said wavefront measuring method.

7. The wavefront measuring method for measuring a wavefront of light passing through an objective lens unit for microscopes according to claim 6, wherein the wavefront aberration of said objective lens for microscopes is a wavefront (phase map) of the objective lens for microscopes.

8. The wavefront measuring method for measuring a wavefront of light passing through an objective lens unit for microscopes according to claim 6, wherein the wavefront aberration of said objective lens for microscopes is a ZERNIKE obtained from a phase map of the objective lens for microscopes.

9. The wavefront measuring method for measuring a wavefront of light passing through an objective lens unit for microscopes according to claim 6, wherein the wavefront aberration of said objective lens for microscopes is a SEIDEL's coefficient calculated from a phase map of the objective lens for microscopes.

10. The wavefront measuring method for measuring a wavefront of light passing through an objective lens unit for microscopes according to claim 6, wherein the wavefront aberration of said objective lens for microscopes is a PV value, and an RMS value.

11. The wavefront measuring method for measuring a wavefront of light passing through an objective lens unit for microscopes according to claim 7, wherein the wavefront aberration of said objective lens for microscopes is affected by a setting error upon measurement of the wavefront aberration, and represented by a value from which a piston term (PST), a power term (PWR) and a tilt term (TILT) are removed.

12. A wavefront measuring apparatus for measuring a wavefront of light passing through objective lens unit for microscopes, which comprises:

a light source;

a reference light path in which a reference member for producing reference light is disposed;

a test light path in which said objective lens unit for microscopes is disposed;

a plano-convex optical member disposed in said test light path in such a manner that a plane surface thereof faces toward said objective lens unit for microscopes, said plano-convex optical member having a wall thickness approximately equal to a radius of curvature of a convex surface thereof;

a space between said objective lens unit for microscopes and said plano-convex optical member filled with a liquid; and a display portion for indicating wavefront aberration of said objective lens for microscopes upon measurement by said wavefront measuring method.

13. The wavefront measuring apparatus for measuring a wavefront of light passing through an objective lens unit for microscopes according to claim 12, wherein the wavefront aberration of said objective lens for microscopes is a wavefront (phase map) of the objective lens for microscopes.

14. The wavefront measuring apparatus for measuring a wavefront of light passing through an objective lens unit for microscopes according to claim 12, wherein the wavefront aberration of said objective lens for microscopes is a ZERNIKE obtained from a phase map of the objective lens for microscopes.

15. The wavefront measuring apparatus for measuring a wavefront of light passing through an objective lens unit for microscopes according to claim 12, wherein the wavefront aberration of said objective lens for microscopes is a SEIDEL's coefficient calculated from a phase map of the objective lens for microscopes.

16. The wavefront measuring apparatus for measuring a wavefront of light passing through an objective lens unit for microscopes according to claim 12, wherein the wavefront aberration of said objective lens for microscopes is a PV value, and an RMS value.

17. The wavefront measuring apparatus for measuring a wavefront of light passing through an objective lens unit for microscopes according to claim 13, wherein the wavefront aberration of said objective lens for microscopes is affected by a setting error upon measurement of the wave front aberration, and represented by a value from which a piston term (PST), a power term (PWR) and a tilt term (TILT) are removed.

* * * * *